US 11,706,655 B2

(12) United States Patent
Zhu et al.

(10) Patent No.: US 11,706,655 B2
(45) Date of Patent: Jul. 18, 2023

(54) DATA TRANSMISSION METHOD AND TERMINAL

(71) Applicant: Huawei Technologies Co., Ltd., Shenzhen (CN)

(72) Inventors: Yuanping Zhu, Shanghai (CN); Xiaoli Shi, Shanghai (CN); Jing Liu, Shanghai (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 150 days.

(21) Appl. No.: 16/704,510

(22) Filed: Dec. 5, 2019

(65) Prior Publication Data

US 2020/0112873 A1   Apr. 9, 2020

Related U.S. Application Data

(63) Continuation of application No. PCT/CN2018/090029, filed on Jun. 6, 2018.

(30) Foreign Application Priority Data

Jun. 6, 2017   (CN) ......................... 201710419488.5

(51) Int. Cl.
*H04W 28/02* (2009.01)
*H04W 4/70* (2018.01)
(Continued)

(52) U.S. Cl.
CPC ......... *H04W 28/0268* (2013.01); *H04W 4/70* (2018.02); *H04W 28/0257* (2013.01);
(Continued)

(58) Field of Classification Search
None
See application file for complete search history.

(56) References Cited

U.S. PATENT DOCUMENTS

2012/0099531 A1\* 4/2012 Star ..................... H04L 69/04
370/328
2013/0287012 A1\* 10/2013 Pragada ................ H04W 76/22
370/338
(Continued)

FOREIGN PATENT DOCUMENTS

CN   106454764 A   2/2017
EP   3148285 A1    3/2017
(Continued)

OTHER PUBLICATIONS

LG Electronics Inc, "Bearer mapping in UE-Network Relay", 3GPP TSG-RAN WG2 Meeting, R2-153164, Aug. 24-28, 2015, 2 pages.
(Continued)

*Primary Examiner* — Steve R Young
(74) *Attorney, Agent, or Firm* — Slater Matsil, LLP

(57) ABSTRACT

Embodiments of this application provide a data transmission method and a corresponding apparatus. The method includes obtaining, by a second terminal, first information, wherein the first information indicates a correspondence between a downlink quality of service (QoS) flow and a downlink device-to-device (D2D) bearer; and sending, by the second terminal to a first terminal based on the correspondence, a downlink data packet on the downlink D2D bearer corresponding to the downlink QoS flow, wherein the downlink data packet is carried on the downlink QoS flow.

20 Claims, 7 Drawing Sheets

(51) Int. Cl.
H04W 76/27 (2018.01)
H04W 80/08 (2009.01)
H04W 80/02 (2009.01)

(52) U.S. Cl.
CPC ........... *H04W 76/27* (2018.02); *H04W 80/02* (2013.01); *H04W 80/08* (2013.01)

(56) References Cited

U.S. PATENT DOCUMENTS

| | | | | |
|---|---|---|---|---|
| 2017/0171837 | A1* | 6/2017 | Chen | H04W 72/20 |
| 2018/0069618 | A1* | 3/2018 | Loehr | H04W 72/1263 |
| 2018/0124633 | A1* | 5/2018 | Hwang | H04W 28/02 |
| 2018/0192457 | A1* | 7/2018 | Yi | H04W 4/70 |
| 2018/0234524 | A1 | 8/2018 | Cheng et al. | |
| 2018/0255499 | A1* | 9/2018 | Loehr | H04W 40/22 |

FOREIGN PATENT DOCUMENTS

| | | | |
|---|---|---|---|
| EP | 3580985 | A1 | 12/2019 |
| WO | 2013163595 | A2 | 10/2013 |
| WO | 2017022959 | A1 | 2/2017 |
| WO | 2017078424 | A1 | 5/2017 |

OTHER PUBLICATIONS

Huawei et al., "Solution for ProSe Priority in PC5 unicast case", 3GPP Draft; S2-153305, Oct. 19-23, 2015, 6 pages.
Huawei, "Report of email discussion [96#57] [LTE/ FeD2D]—Adapter layer and bearer handling", 3GPP TSG-RAN WG2 Meeting #97, R2-1701133, Feb. 13-17, 2017, 12 pages.
3GPP TR 36.746, V0.6.0, 3rd Generation Partnership Project; Technical Specification Group Radio Access Network; Study on further enhancements to LTE Device to Device (D2D), User Equipment (UE) to network relays for Internet of Things (IoT) and wearables; (Release 15), LTE Advanced Pro, May 2017, 36 pages.
Nokia et al., "Bearer modelling and E2E QoS support for layer-2 relaying", 3GPP TSG-RAN WG2 Meeting # 98, R2-1704325, May 15-19, 2017, 5 pages.
ZTE, "Bearer Configuration at Relay UE in feD2D", 3GPP TSG-RAN WG2 Meeting # 98, R2-1704635, May 15-19, 2017, 4 pages.
LG Electronics Inc., "Configurability for UL QoS flow ID marking", 3GPP TSG-RAN2 Meeting # 98, R2-1704469, May 15-19, 2017, 4 pages.
LG Electronics Inc., "Consideration of Bearer configuration in FeD2D", 3GPP TSG RAN WG2 # 98, R2-1704544, May 15-19, 2017, 5 pages.
Huawei et al., "QoS Flow to DRB Re-Mapping", 3GPP TSG-RAN WG2 Meeting # 98, R2-1704987, May 15-19, 2017, 6 pages.
ZTE, "Considerations on the SI for LTE Device to Device Proximity Services", 3GPP TSG-RAN WG2 Meeting #83, R2-132679, Barcelona, Spain, Aug. 19-23, 2013, 7 pages.
3GPP TR 38.804 V14.0.0 (Mar. 2017), 3rd Generation Partnership Project; Technical Specification Group Radio Access Network; Study on New Radio Access Technology; Radio Interface Protocol Aspects (Release 14), 57 pages.
ETSI MCC, "Report of 3GPP TSG RAN WG2 meeting #96" 3GPP TSG-RAN Working Group 2 meeting #97, R2-1700671, Athens, Greece, Feb. 13-17, 2017, 231 pages.

* cited by examiner

DATA TRANSMISSION METHOD AND TERMINAL

CROSS-REFERENCE TO RELATED APPLICATIONS

This application is a continuation of International Application No. PCT/CN2018/090029, filed on Jun. 6, 2018, which claims priority to Chinese Application No. 201710419488.5, filed on Jun. 6, 2017. The disclosures of the aforementioned applications are hereby incorporated by reference in their entireties.

TECHNICAL FIELD

Embodiments of the present application relate to the wireless communication field, and in particular, to a data transmission method and a terminal.

BACKGROUND

In device-to-device (D2D) communication, a first terminal out of coverage of a wireless communications system or in the coverage of the wireless communications system may communicate with a wireless network by establishing a sidelink connection (also may be referred to as a D2D connection) to a second terminal that has accessed the wireless communications system. Generally, the first terminal may be referred to as a remote terminal or a D2D terminal, and the second terminal may be referred to as a relay terminal. In a further evolved system of an LTE system and a fifth generation wireless communications system, an air interface between the second terminal and a wireless access device is used to transmit various information based on a radio bearer (RB), and a tunnel connection between the wireless access device and a core network device is used to transmit various information based on a quality of service (QoS) flow.

On a downlink, the core network device receives, from the Internet, a downlink data packet sent to the first terminal, where the downlink data packet is transmitted from the Internet to the core network device in a form of an Internet protocol (IP) data packet. The core network device adds the IP data packet to at least one QoS flow, and the core network device sends, on the tunnel connection, the downlink data packet to the wireless access device by using the at least one QoS flow. The wireless access device adds the downlink data packet to the RB, and sends the downlink data packet to the second terminal on the air interface by using the RB. The second terminal sends the downlink data packet to the first terminal by using the D2D connection.

On an uplink, the first terminal sends an uplink data packet to the wireless access device by using the second terminal. The wireless access device adds the uplink data packet from the RB to the QoS flow, and sends, on the tunnel connection, the uplink data packet to the core network device by using the QoS flow. The core network device further sends the uplink data packet to the Internet in the form of an IP data packet.

In the foregoing transmission mechanism, quality of service requirements that are required by data packets are not distinguished on the D2D connection between the first terminal and the second terminal. Therefore, data packets with a same quality of service requirement may not have same quality of service, thereby reducing wireless communication quality.

SUMMARY

Embodiments of this application provide a data transmission method and an apparatus to improve wireless communication quality.

According to a first aspect, an embodiment of this application provides a data transmission method, including the following content: obtaining, by a second terminal, first information, where the first information indicates a correspondence between a downlink QoS flow and a downlink device-to-device D2D bearer; and sending, by the second terminal to a first terminal based on the correspondence on the downlink D2D bearer corresponding to the downlink QoS flow, a downlink data packet carried on the downlink QoS flow.

In the technical solution provided in the first aspect, the downlink quality of service QoS flow corresponds to the downlink D2D bearer, so that the downlink data packet carried on the downlink QoS flow is transmitted on the corresponding downlink D2D bearer. In this way, downlink data packets carried on the downlink QoS flow can be provided with same quality of service, thereby avoiding a problem that downlink data packets carried on a same downlink QoS flow are provided with different quality of service on a D2D connection, thereby improving wireless communication quality.

Based on the first aspect, in a first possible implementation, the obtaining, by a second terminal, first information includes: receiving, by the second terminal, the first information configured by a wireless access device serving the second terminal or a core network device serving the second terminal; or obtaining, by the second terminal, the first information configured by the second terminal; or reading, by the second terminal, the first information preset in the second terminal.

In the technical solution provided in the first possible implementation, the second terminal may obtain the first information in a plurality of manners, thereby improving flexibility of obtaining the first information by the second terminal.

According to a second aspect, an embodiment of this application provides a data transmission method, including the following content: obtaining, by a second terminal, second information, where the second information indicates a correspondence between a downlink QoS flow and a device-to-device D2D data packet priority; and sending, by the second terminal to a first terminal based on the correspondence and the D2D data packet priority corresponding to the downlink QoS flow, a downlink data packet carried on the downlink QoS flow.

In the technical solution provided in the second aspect, the downlink QoS flow corresponds to the D2D data packet priority, so that the second terminal can send data based on the D2D data packet priority corresponding to the QoS flow in which the downlink data packet is located, thereby avoiding a problem that downlink data packets carried on a same downlink QoS flow are provided with different quality of service on a D2D connection, thereby improving wireless communication quality.

Based on the second aspect, in a second possible implementation, the obtaining, by a second terminal, second information includes: receiving, by the second terminal, the second information configured by a wireless access device serving the second terminal or a core network device serving the second terminal; or obtaining, by the second terminal, the second information configured by the second terminal;

or reading, by the second terminal, the second information preset in the second terminal.

In the technical solution provided in the second possible implementation, the second terminal may obtain the second information in a plurality of manners, thereby improving flexibility of obtaining the second information by the second terminal.

Based on any one of the first aspect, the first possible implementation, the second aspect, and the second possible implementation, in a third possible implementation, the downlink data packet includes at least one of an identifier of the downlink QoS flow and an identifier of the first terminal.

In the technical solution provided in the third possible implementation, the identifier of the QoS flow in the downlink data packet may be used to identify the QoS flow carrying the downlink data packet, and the identifier of the first terminal in the downlink data packet may be used to identify that the downlink data packet is sent to the first terminal.

Based on any one of the first aspect, the second aspect, and the first possible implementation to the third possible implementation, in a fourth possible implementation, the downlink data packet is an RRC message; and the downlink data packet is encapsulated in a packet data convergence protocol (PDCP) data packet, and the PDCP data packet includes information indicating that the downlink data packet is a radio resource control (RRC) message sent by the wireless access device to the first terminal; or the downlink data packet is encapsulated in a radio link control (RLC) data packet, and the RLC data packet includes information indicating that the downlink data packet is an RRC message sent by the wireless access device to the first terminal.

In the technical solution provided in the fourth possible implementation, when the downlink data packet is the RRC message sent to the first terminal, the second terminal may not parse content of the downlink data packet, directly use the RRC message as control plane signaling, and send the RRC message to the first terminal, to implement a control plane connection between the first terminal and the wireless access device.

According to a third aspect, an embodiment of this application provides a data transmission method, including the following content: receiving, by the second terminal, a first uplink data packet sent by a first terminal; and sending, by the second terminal based on a correspondence between an uplink QoS flow required by the first uplink data packet and an uplink radio bearer on the radio bearer corresponding to the QoS flow, a second uplink data packet to a wireless access device serving the second terminal, where the second uplink data packet includes a part or all of the first uplink data packet.

In the technical solution provided in the third aspect, the second terminal sends the first uplink data packet in a form of the second uplink data packet on the radio bearer corresponding to the QoS flow required by the first uplink data packet, so that uplink data packets that have a same quality of service requirement between the second terminal and the first terminal are transmitted on a corresponding radio bearer, thereby avoiding a problem that uplink data packets requiring a same uplink QoS flow are provided with different quality of service on an air interface, thereby improving wireless communication quality.

Based on the third aspect, in a fifth possible implementation, the method further includes: receiving, by the second terminal, third information configured by the wireless access device or a core network device, where the third information indicates the correspondence between the uplink QoS flow and the uplink radio bearer; or receiving, by the second terminal, fourth information configured by the wireless access device or the core network device, where the fourth information indicates a correspondence between a downlink QoS flow and a downlink radio bearer, and the fourth information is used to determine the third information; or reading, by the second terminal, the correspondence that is between the uplink QoS flow and the uplink radio bearer and that is preset on the second terminal.

In the technical solution provided in the fifth possible implementation, the second terminal may obtain the correspondence between an uplink QoS flow and an uplink radio bearer in a plurality of manners, thereby improving flexibility of obtaining the correspondence between an uplink QoS flow and an uplink radio bearer by the second terminal.

According to a fourth aspect, an embodiment of this application provides a data transmission method, including the following content: receiving, by a second terminal, a first uplink data packet sent by a first terminal, where the first uplink data packet includes indication information of a device-to-device (D2D) data packet priority of the first uplink data packet; and sending, by the second terminal based on a correspondence between the D2D data packet priority of the first uplink data packet and a radio bearer, a second uplink data packet on an uplink radio bearer corresponding to the D2D data packet priority, where the second uplink data packet includes a part or all of the first uplink data packet.

In the technical solution provided in the fourth aspect, the correspondence between a D2D data packet priority and a radio bearer is used to send the uplink data packet on a corresponding radio bearer, thereby avoiding a problem that uplink data packets of a same D2D data packet priority are provided with different quality of service on an air interface, thereby improving wireless communication quality.

Based on the fourth aspect, in a sixth possible implementation, the method further includes: receiving, by the second terminal, fifth information configured by the wireless access device or a core network device, where the fifth information indicates a correspondence between an uplink radio bearer and the D2D data packet priority; or reading, by the second terminal, the correspondence that is between the uplink radio bearer and the D2D data packet priority and that is preset on the second terminal.

In the technical solution provided in the sixth possible implementation, the second terminal may obtain the correspondence between an uplink radio bearer and a D2D data packet priority in a plurality of manners, thereby improving flexibility of obtaining the correspondence between the uplink radio bearer and the D2D data packet priority by the second terminal.

Based on the third aspect, the fourth aspect, the fifth possible implementation, or the sixth possible implementation, in a seventh possible implementation, the first uplink data packet includes at least one of an identifier of the QoS flow required by the first uplink data packet and an identifier of the first terminal.

In the technical solution provided in the seventh possible implementation, the identifier of the QoS flow in the first uplink data packet may be used to identify the QoS flow required by the first uplink data packet, and the identifier of the first terminal in the first uplink data packet may be used to identify that the first uplink data packet is sent by the first terminal.

Based on any one of the third aspect, the fourth aspect, and the fifth possible implementation to the seventh possible implementation, in an eighth possible implementation, the second uplink data packet further includes at least one of the identifier of the QoS flow required by the first uplink data packet and the identifier of the first terminal.

In the technical solution provided in the eighth possible implementation, the identifier of the QoS flow in the second uplink data packet may be used to identify the QoS flow required by the first uplink data packet, and the identifier of the first terminal in the second uplink data packet may be used to identify that the second uplink data packet is sent by the first terminal.

Based on any one of the third aspect, the fourth aspect, and the fifth possible implementation to the eighth possible implementation, in a ninth possible implementation, the first uplink data packet is an RRC message; and the first uplink data packet is encapsulated in a packet data convergence protocol (PDCP) data packet, and the PDCP data packet includes information indicating that the first uplink data packet is a radio resource control (RRC) message sent by the first terminal to the wireless access device; or the first uplink data packet is encapsulated in a radio link control (RLC) data packet, and the RLC data packet includes information indicating that the first uplink data packet is an RRC message sent by the first terminal to the wireless access device.

In the technical solution provided in the ninth possible implementation, when the uplink data packet is the RRC message sent by the first terminal to the wireless access device, the second terminal may not parse content of the uplink data packet, directly use the RRC message as control plane signaling, and send the RRC message to the wireless access device, to implement a control plane connection between the first terminal and the wireless access device.

According to a fifth aspect, an embodiment of this application provides a data transmission method, including the following content: obtaining, by a first terminal, a correspondence between an uplink QoS flow required by a first uplink data packet and an uplink device-to-device (D2D) bearer; and sending, by the first terminal, the first uplink data packet to a second terminal on the uplink D2D bearer corresponding to the uplink QoS flow.

In the technical solution provided in the fifth aspect, the correspondence between an uplink QoS flow and an uplink D2D bearer is used to send the uplink data packet on a corresponding D2D bearer, thereby avoiding a problem that uplink data packets requiring a same uplink QoS flow are provided with different quality of service on a D2D connection, thereby improving wireless communication quality.

According to a sixth aspect, an embodiment of this application provides a data transmission method, including the following content: obtaining, by a first terminal, a correspondence between an uplink QoS flow required by a first uplink data packet and a device-to-device (D2D) data packet priority of the first uplink data packet; and sending, by the first terminal, the first uplink data packet to the second terminal on a D2D connection to the second terminal based on the D2D data packet priority corresponding to the QoS flow required by the first uplink data packet.

In the technical solution provided in the sixth aspect, the correspondence between an uplink QoS flow and a D2D data packet priority is used to send uplink data packets on the D2D connection between the first terminal and the second terminal based on corresponding D2D data packet priorities, thereby avoiding a problem that uplink data packets requiring a same uplink QoS flow are provided with different quality of service, thereby improving wireless communication quality.

Based on the fifth aspect or the sixth aspect, in a tenth possible implementation, the obtaining, by a first terminal, a correspondence includes: receiving, by the first terminal, the correspondence configured by a wireless access device serving the second terminal or a core network device serving the second terminal; or receiving, by the first terminal, the correspondence configured by the second terminal; or reading, by the first terminal, the correspondence preset in the first terminal.

In the technical solution provided in the tenth possible implementation, the first terminal may obtain the correspondence between an uplink QoS flow and a D2D data packet priority in a plurality of manners, thereby improving flexibility of obtaining the correspondence by the first terminal.

Based on the fifth aspect, the sixth aspect, or the tenth possible implementation, in an eleventh possible implementation, the first uplink data packet is an RRC message; and the first uplink data packet is encapsulated in a packet data convergence protocol (PDCP) data packet, and the PDCP data packet includes information indicating that the first uplink data packet is a radio resource control (RRC) message sent by the first terminal to the wireless access device; or the first uplink data packet is encapsulated in an RLC data packet, and the RLC data packet includes information indicating that the first uplink data packet is an RRC message sent by the first terminal to the wireless access device.

In the eleventh possible implementation, when the uplink data packet is the RRC message sent by the first terminal to the wireless access device, the second terminal may directly not parse content of the uplink data packet, directly use the RRC message as control plane signaling, and send the RRC message to the wireless access device, to implement control plane connection between the first terminal and the wireless access device.

According to a seventh aspect, an embodiment of this application provides a computer storage medium. The computer storage medium includes program code. The program code is used to implement the technical solution provided in any one of the first aspect to the sixth aspect and the first possible implementation to the tenth possible implementation. The technical solution provided in the seventh aspect has a technical effect of the foregoing corresponding implementation. For details, refer to the foregoing implementation.

According to an eighth aspect, an embodiment of this application provides a communications apparatus. The communications apparatus includes a processor and a memory. The memory stores code, and the processor invokes code in the memory, to implement all or some of the technical solutions provided in any one of the first aspect to the sixth aspect and the first possible implementation to the tenth possible implementation. The communications apparatus provided in the eighth aspect may be a first terminal or a second terminal in any one of the foregoing aspects or possible implementations, or may be a chip. When the communications apparatus is a chip, the chip includes a processor including at least one gate circuit and a memory including at least one gate circuit. Each gate circuit includes at least one transistor (for example, a field effect transistor) connected by using a wire. Each transistor is made of a semiconductor material. The technical solution provided in the eighth aspect has a technical effect of the foregoing corresponding implementation. For details, refer to the foregoing implementation.

According to a ninth aspect, an embodiment of this application further provides a first terminal. The first terminal includes an obtaining unit and a sending unit. The obtaining unit is configured to execute an obtaining action of the first terminal in the foregoing implementations. The obtaining action may specifically include actions such as reading and receiving. The sending unit is configured to execute a sending action of the first terminal in the foregoing implementations. In physical implementation, the reading action of the obtaining unit may be specifically performed by a processor of the first terminal; the receiving action of the obtaining unit is performed by a receiver of the first terminal; the sending action of the sending unit may be performed by a transmitter of the first terminal; and the processor, the receiver, and the transmitter of the first terminal are directly or indirectly connected by using a physical bus. The technical solution provided in the ninth aspect has a technical effect of the foregoing corresponding implementation. For details, refer to the foregoing implementation.

According to a tenth aspect, an embodiment of this application further provides a second terminal. The second terminal includes an obtaining unit and a sending unit. The obtaining unit is configured to execute an obtaining action of the second terminal in the foregoing implementations. The obtaining action may specifically include actions such as reading and receiving. The sending unit is configured to execute a sending action of the second terminal in the foregoing implementations. In physical implementation, the reading action of the obtaining unit may be specifically performed by a processor of the second terminal; the receiving action of the obtaining unit is performed by a receiver of the second terminal; the sending action of the sending unit may be performed by a transmitter of the second terminal; and the processor, the receiver, and the transmitter of the second terminal are directly or indirectly connected by using a physical bus. The technical solution provided in the tenth aspect has a technical effect of the foregoing corresponding implementation. For details, refer to the foregoing implementation.

DETAILED DESCRIPTION OF ILLUSTRATIVE EMBODIMENTS

Figure 1:
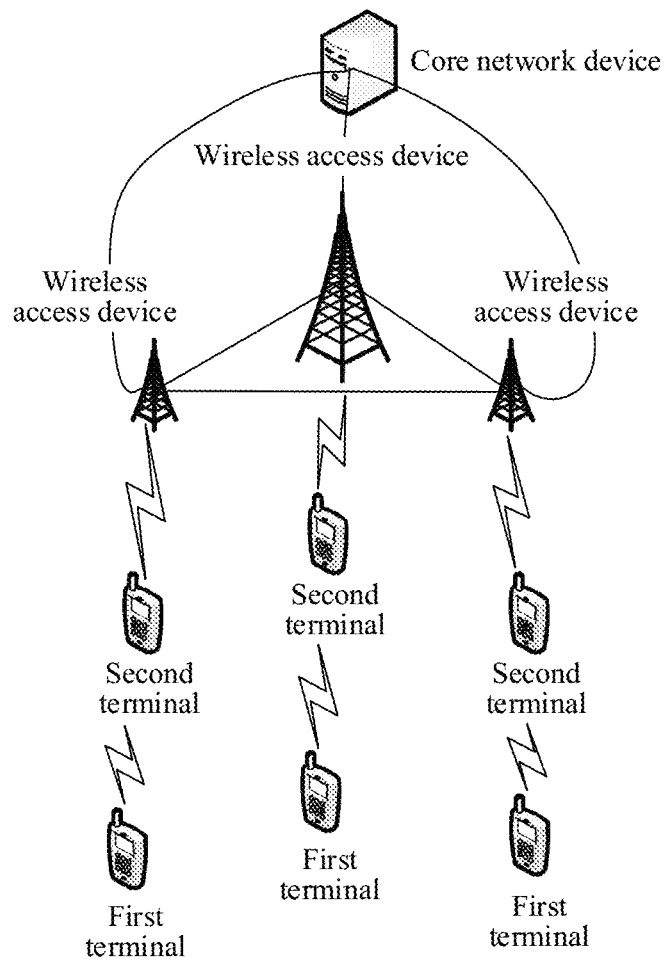
FIG. 1 is a schematic architectural diagram of a wireless communications system according to an embodiment of this application.

In a schematic architectural diagram of a wireless communications system shown in FIG. 1, the wireless communications system includes a first terminal, a second terminal, a wireless access device, and a core network device. The first terminal transmits various data with the second terminal by using a D2D connection; and the second terminal transmits various data with the wireless access device on a licensed spectrum or an unlicensed spectrum by using an air interface. The wireless access device transmits various data with the core network device through a tunnel connection.

In the embodiments of this application, the first terminal and the second terminal are also referred to as user equipment (UE) or mobile stations, including a mobile phone, a handheld internet of things device, a wearable device, and the like.

In the embodiments of this application, the wireless access device includes various transmission reception points (TRP) such as a base station or a wireless local area network access point. The base station may be classified into a macro base station and a small cell base station, and the small cell is classified into a micro base station, a pico base station, and the like. The wireless local area network access point may be a router, a switch, or the like.

The foregoing various types of data, for example, control signaling or service data, is transmitted between the first terminal, the second terminal, and the wireless access device on an uplink and a downlink based on protocol layers. These protocol layers include a physical (PHY) layer, a media access control (MAC) layer, a radio link control (RLC) layer, a packet data convergence protocol (PDCP) layer, and the like. Regardless of a layer at which data is transmitted, the data is finally carried on the physical layer, and is transmitted in wireless space by using at least one physical antenna.

To implement data transmission at the physical layer, a plurality of time units are obtained through division in time domain, and a plurality of frequency units are obtained through division in frequency domain. Each time unit is a transmission time interval (TTI). For example, in a long term evolution (LTE) system, one TTI may be one radio frame. A length of a radio frame is 10 milliseconds (ms), and includes 10 1-ms subframes. Each subframe includes several orthogonal frequency division multiplexing (OFDM) symbols. A frequency unit may be a subcarrier. In the LTE system, a width of the subcarrier in frequency domain is usually 15 kilohertz (kHz). Different system bandwidths can be implemented by using combinations of different quantities of subcarriers.

With continuous evolution of the LTE system and development of a fifth generation mobile communications system, the foregoing various types of data transmitted between the first terminal, the second terminal, and the wireless access device include enhanced mobile broadband (eMBB) data, massive machine type communication (mMTC) data, and ultra-reliable and low latency communication (URLLC) data. In time domain and frequency domain of the physical layer, a length occupied by one time unit in time and a width occupied by one frequency unit in frequency may vary with different wireless communication requirements of the data. The wireless communications system may implement, by using different radio parameter configurations, definition of the time unit and the frequency unit that are used for data transmission. The radio parameter configuration may be referred to as a numerology parameter in the fifth generation mobile communications system.

Figure 2:
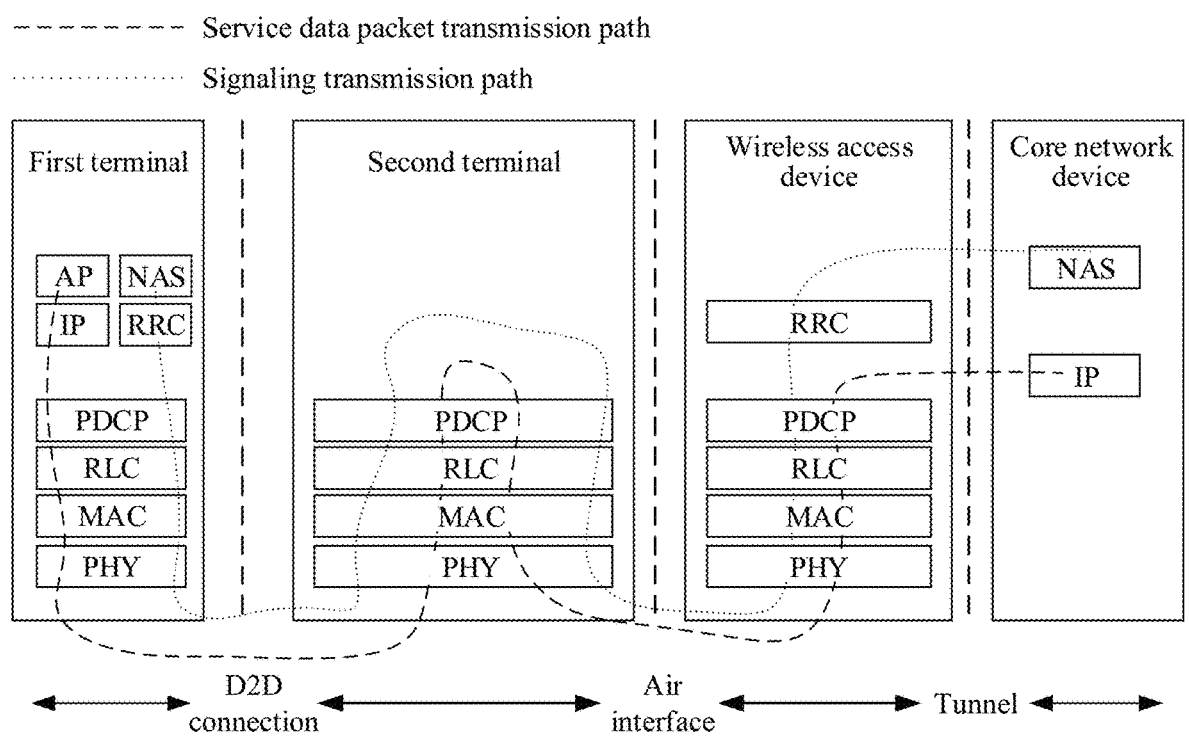
FIG. 2 is a schematic diagram of a protocol stack of a wireless communications system according to an embodiment of this application.

FIG. 2 is a schematic diagram of a protocol stack of the wireless communications system shown in FIG. 1. In FIG. 2, the second terminal transmits, on the air interface based on a wireless bearer, data with a wireless access device serving the second terminal, and the wireless access device transmits data with the core network device through the tunnel connection based on a QoS flow. One QoS flow can provide a guarantee for quality of service. The first terminal transmits data with the wireless access device by using the D2D connection established between the first terminal and the second terminal, and the first terminal further transmits data with the core network device by using the wireless access device. The first terminal, the second terminal, and the wireless access device every two include a peer-to-peer PHY layer, a peer-to-peer MAC layer, a peer-to-peer RLC layer, and a peer-to-peer PDCP layer. In the embodiments of this application, the first terminal and the second terminal are used as an example. Generally, in addition to the first terminal and the second terminal, the wireless communications system may include more terminals.

A person skilled in the art may implement different communication requirements of the wireless communications system in at least one manner of reusing the foregoing protocol layers, adding a new protocol layer, and deleting a protocol layer. For example, to implement the technical solutions in the embodiments of this application, a new peer-to-peer protocol layer may be added between the first terminal, the second terminal, and the wireless access device to support the QoS flow. The newly added protocol layer is, for example, a service data adaptation protocol (SDAP) layer currently discussed by the 3rd generation partnership project (3GPP) organization or a protocol layer with another name.

In the embodiments of this application, data transmission is performed in a form of a data packet, and the data packet may be a service (such as video or voice) data packet or signaling. Therefore, an uplink data packet includes at least one of an uplink service data packet and uplink signaling, and a downlink data packet includes at least one of a downlink service data packet and downlink signaling. An uplink service data packet of the first terminal is generated from an application (AP) layer (such as WeChat) of the first terminal; passes through an internet protocol (IP) layer of the first terminal, and PDCP layers, RLC layers, MAC layers, and PHY layers of the first terminal, the second terminal, and the wireless access device; and reaches an IP layer of the core network device. Uplink signaling of the first terminal passes through a non-access (NAS) layer and a radio resource control (RRC) layer of the first terminal, then the PDCP layers, the RLC layers, the MAC layers, and the PHY layers of the first terminal, the second terminal, and the wireless access device, and an RRC layer of the wireless access device; and reaches a NAS layer of the core network device through. Transmission of the downlink service data packet is a reverse transmission process of the uplink service data packet, and transmission of the downlink signaling is a reverse transmission process of the uplink signaling. In the embodiments of this application, a radio bearer on the air interface may be a data radio bearer used to transmit service data or signaling, or may be a signaling radio bearer used to transmit signaling. A tunnel between the wireless access device and the core network device may be a user plane tunnel used to transmit service data or a control plane tunnel used to transmit signaling.

A person skilled in the art may understand that the foregoing description of a transmission path of the data packet is an example for ease of understanding. In an actual transmission process, different protocol layers may be added or deleted to meet a requirement of the communications system. For example, when the second terminal needs to transmit uplink signaling, the second terminal further includes a NAS layer and an RRC layer to transmit uplink signaling generated by the second terminal. For another example, after the uplink service data packet of the first terminal reaches the IP layer of the core network device, if the IP data packet is transmitted by using a user datagram protocol (UDP), processing is performed at a UDP layer; or if the IP data packet is transmitted by using a transmission control protocol (TCP), processing is performed at a TCP layer.

As a D2D communications technology is applied to the fifth generation mobile communications system, a plurality of data packets may be transmitted on a D2D connection between the first terminal and the second terminal. Because quality of service requirements of the plurality of data packets are not distinguished on the D2D connection, different data packets with a same quality of service requirement may be provided with different quality of service. Some data packets requiring high quality of service may be scheduled on a time-frequency resource with low channel quality; and therefore cannot obtain high quality of service. However, some uplink data packets requiring low quality of service may be scheduled on a time-frequency resource with high channel quality, thereby causing a waste of resources. Consequently, overall wireless communication quality is reduced.

In different embodiments of this application, a QoS flow required by the data packet corresponds to a D2D bearer on a D2D connection, a QoS flow required by the data packet corresponds to a radio bearer on an air interface, a D2D data packet priority corresponds to a QoS flow, or a D2D data packet priority corresponds to a radio bearer on an air interface. In this case, a data packet is transmitted by using a bearer or a D2D data packet priority determined based on a correspondence, and a transmission status of another data packet may not be considered. Different data packets of a same quality of service requirement can also obtain a same quality of service, thereby improving the wireless communication quality. Generally, high quality of service provided by a QoS flow required by a data packet corresponds to high quality of service provided by a bearer or a D2D data packet priority determined based on a correspondence, and a low quality of service provided by a QoS flow required by a data packet corresponds to low quality of service provided by a bearer or a D2D data packet priority determined based on a correspondence.

Figure 3:
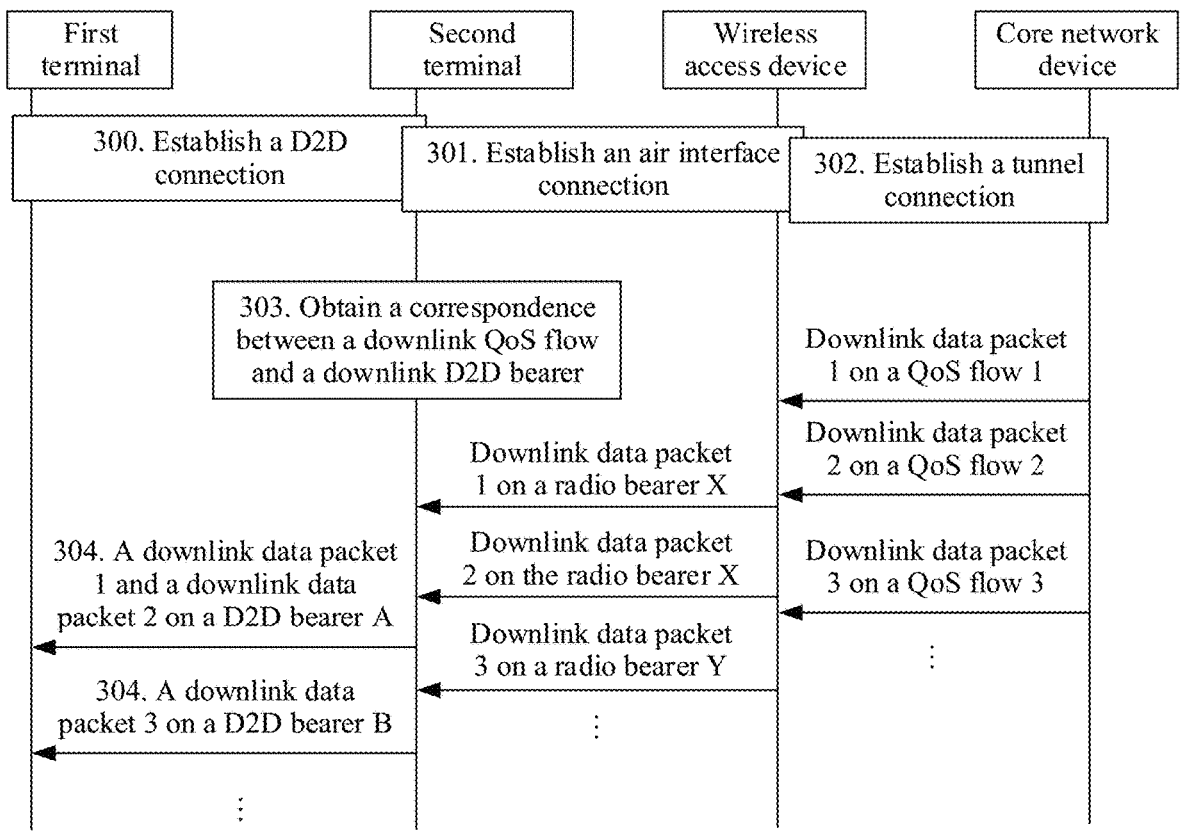
FIG. 3 is a schematic diagram of system interaction of a data transmission method according to an embodiment of this application.

One aspect of the embodiments of this application provides a data transmission method. FIG. 3 is a schematic diagram of system interaction of the data transmission method. This embodiment relates to a transmission process of a downlink data packet. A downlink QoS flow in which the downlink data packet is located corresponds to a downlink D2D bearer, to ensure wireless communication quality.

300. A first terminal establishes a D2D connection to a second terminal.

For specific implementation of a process of establishing the D2D connection between two different terminals in 300 and establishing a D2D bearer on the D2D connection, refer to a current technology, for example, 3GPP TS 36.300 V14.1.0 or 3GPP TS 23.303 V14.1.0.

301. The second terminal establishes an air interface connection to a wireless access device.

For a process of establishing the air interface connection between the second terminal and the wireless access device and establishing a radio bearer on the air interface connection, refer to a current technology, for example, 3GPP TS 36.300 V14.1.0 or 3GPP TS 23.303 V14.1.0.

302. The wireless access device establishes a tunnel connection to a core network device.

For a process of establishing the tunnel connection between the wireless access device and the core network device and transmitting data on the tunnel connection based on a QoS flow, refer to a current technology, for example, 3GPP TS 38.300 V0.2.1.

303. The second terminal obtains first information, where the first information indicates a correspondence between a downlink QoS flow and a downlink device-to-device D2D bearer.

It should be noted that there is no sequence among 300, 301, 302, and 303.

In 303, the second terminal may receive the first information configured by a wireless access device serving the second terminal or a core network device serving the second terminal; the second terminal may also configure the first information to achieve a purpose of obtaining the first information; and the first information may also be preset in the second terminal, and is read when the second terminal needs to use the first information. Optionally, if the second terminal receives the first information from the wireless access device serving the second terminal, the second terminal feeds back, to the wireless access device, whether the first information is correctly received.

A scenario in which the second terminal obtains the first information may be a scenario in which the first terminal finds that the D2D connection may be established to the second terminal. For example, the first terminal finds the second terminal that can implement establishment of the D2D connection. Therefore, the first terminal sends a D2D connection establishment request to the wireless access device by using the second terminal. The wireless access device may notify the second terminal of configuration information required for establishing the D2D connection, and the configuration information includes the first information.

In the scenario in which the second terminal obtains the first information, the first information may be preset in the second terminal when the second terminal is manufactured.

In the scenario in which the second terminal obtains the first information, the wireless access device may notify the second terminal of the first information in a scenario in which the second terminal when powered on initially accesses the wireless access device, re-accesses the wireless access device due to a radio link failure (RLF), or is handed over from another wireless access device to the wireless access device.

In a possible implementation, the wireless access device notifies the second terminal of the correspondence between a downlink QoS flow and a downlink D2D bearer.

In another possible implementation, the wireless access device notifies the second terminal of a correspondence between an uplink QoS flow and an uplink D2D bearer. The second terminal uses the correspondence between an uplink QoS flow and an uplink D2D bearer as the correspondence between a downlink QoS flow and a downlink D2D bearer. This manner is referred to as reflective mapping, to achieve a purpose of saving signaling. Therefore, in the reflective mapping, the correspondence between an uplink QoS flow and an uplink D2D bearer is the same as the correspondence between a downlink QoS flow and a downlink D2D bearer. Optionally, the wireless access device may notify the second terminal of whether the correspondence between an uplink QoS flow and an uplink D2D bearer can be used for reflective mapping.

The first information may indicate a correspondence between at least one downlink QoS flow and at least one downlink D2D bearer. In the correspondence, one downlink D2D bearer may uniquely correspond to one downlink QoS flow, and one downlink D2D bearer may also uniquely correspond to at least two QoS flows. When a downlink data packet is to be transmitted, the second terminal may find, in the correspondence, a D2D bearer corresponding to a downlink QoS flow that carries the downlink data packet. In an example, the correspondence between at least one downlink QoS flow and at least one downlink D2D bearer may be represented in a form in the following Table 1. A QoS flow 1 and a QoS flow 2 correspond to a D2D bearer A, a QoS flow 3 corresponds to a D2D bearer B, and a QoS flow 4 corresponds to a D2D bearer C.

TABLE 1

| Identifier of a D2D bearer | Identifier of a QoS flow |
| --- | --- |
| A | 1 |
|   | 2 |
| B | 3 |
| C | 4 |
| ... | ... |

304. The second terminal sends, on the downlink D2D bearer based on the correspondence between the downlink QoS flow and the downlink D2D bearer, a downlink data packet carried on the downlink QoS flow.

For example, it is assumed that a to-be-transmitted downlink data packet is carried on the QoS flow 1, and the second terminal may determine, based on the correspondence in Table 1, that the QoS flow 1 corresponds to the D2D bearer A, adds the downlink data packet on the QoS flow 1 to the D2D bearer A, and sends the downlink data packet to the first terminal by using the D2D bearer A. For example, it is assumed that the to-be-transmitted downlink data packet is carried on the QoS flow 4, and the second terminal adds an uplink data packet on the QoS flow 4 to the D2D bearer C, and sends the uplink data packet to the first terminal.

In a possible implementation, to identify a QoS flow on which a downlink data packet is carried, the downlink data packet includes an identifier of the QoS flow.

In a possible implementation, to identify a first terminal that receives a downlink data packet, the downlink data packet includes an identifier of the first terminal that receives the downlink data packet.

In a possible implementation, when the downlink data packet may be an RRC message, the downlink data packet is encapsulated in a PDCP data packet, and the PDCP data packet includes information indicating that the downlink data packet is an RRC message sent by the wireless access device to the first terminal; or the downlink data packet is encapsulated in an RLC data packet, and the RLC data packet includes information indicating that the downlink data packet is an RRC message sent by the wireless access device to the first terminal. In the possible implementation, after receiving the downlink data packet, if the second terminal determines that the downlink data packet is the RRC message sent to the first terminal, the second terminal does not parse content of the downlink data packet, and directly forwards the downlink data packet to the first terminal. As control plane signaling, the RRC message may be used to establish a control plane connection between the wireless access device and the first terminal.

It should be further noted that in this embodiment, there may be two establishment manners of establishing the downlink D2D bearer: (1) Establish at least two D2D bearers before the downlink data packet reaches the second terminal. After the downlink data packet reaches the second terminal, the second terminal determines, from the at least two D2D bearers, a D2D bearer corresponding to a QoS flow in which the downlink data packet is located, and sends the downlink data packet to the first terminal on the corresponding D2D bearer. (2) Establish the corresponding D2D bearer after the downlink data packet reaches the second terminal, and the second terminal determines the D2D bearer corresponding to the QoS flow in which the downlink data packet is located, to send downlink data on the corresponding D2D bearer.

Optionally, in step 304, specifically, the downlink data packet may be transmitted at a protocol layer above the peer-to-peer PDCP layers of the second terminal and the first terminal. The protocol layer may reuse an existing protocol layer above the PDCP layer, for example, an SDAP layer; or the protocol layer may be a new protocol layer above the SDAP layer. A specific name of the protocol layer is not limited in this application.

In the technical solutions provided in this embodiment, the downlink quality of service QoS flow corresponds to the downlink D2D bearer, so that the downlink data packet carried on the downlink QoS flow is transmitted on the corresponding downlink D2D bearer. Therefore, the downlink data packet carried on the downlink QoS flow can be provided with same quality of service. This can avoid a problem that downlink data packets carried on a same downlink QoS flow are provided with different quality of service on the D2D connection, thereby improving wireless communication quality.

Figure 4:
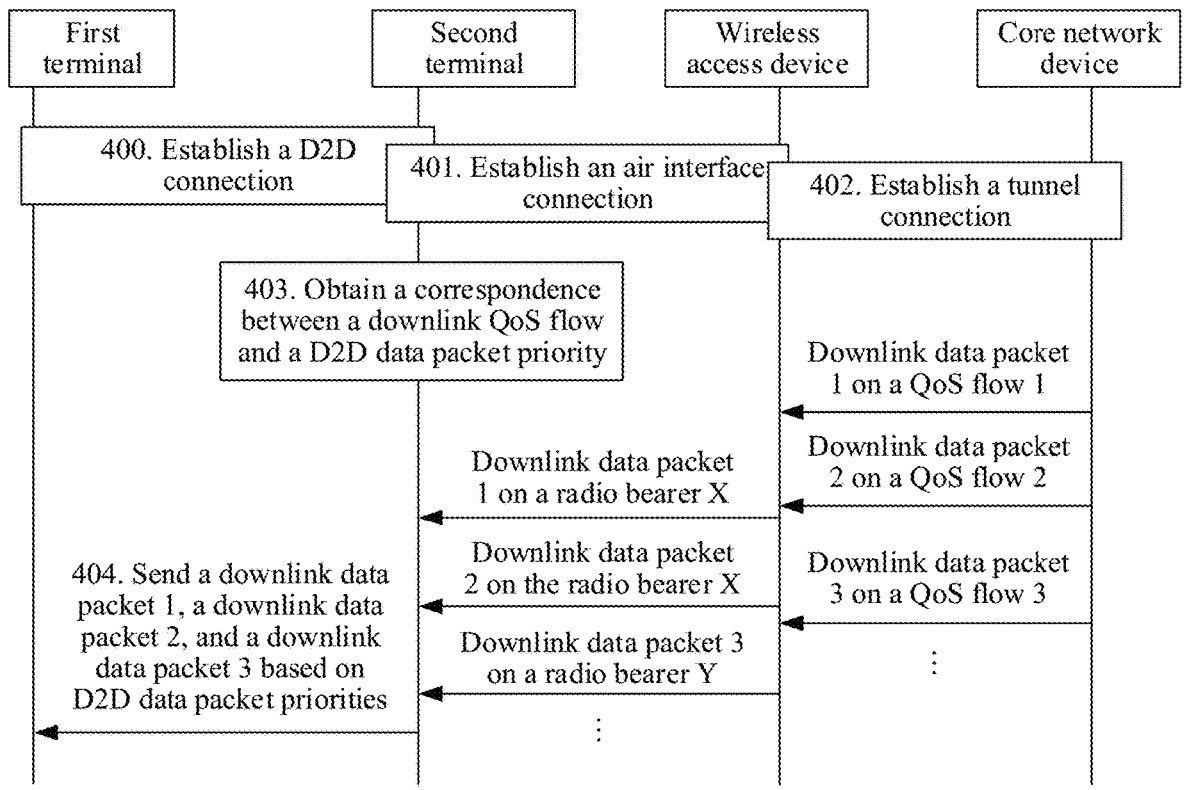
FIG. 4 is a schematic diagram of system interaction of a data transmission method according to an embodiment of this application.

One aspect of the embodiments of this application provides a data transmission method. FIG. 4 is a schematic diagram of system interaction of the data transmission method. This embodiment relates to a transmission process of a downlink data packet. A downlink QoS flow required by the downlink data packet corresponds to a D2D data packet priority, thereby ensuring wireless communication quality.

400. A first terminal establishes a D2D connection to a second terminal.

In 400, the D2D connection is established between two different terminals. The entire D2D connection is considered as a whole, and does not need to be classified into at least two D2D bearers. For details, refer to a current technology, for example, 3GPP TS 36.300 V14.1.0 or 3GPP TS 23.303 V14.1.0. A person skilled in the art may understand that in this case, the entire D2D connection may be considered as a D2D bearer.

401 and 402 are respectively the same as 301 and 302.

403. The second terminal obtains second information, where the second information indicates a correspondence between a downlink QoS flow and a D2D data packet priority.

There is no sequence among 400, 401, 402, and 403.

In this embodiment of this application, the D2D data packet priority is a priority of D2D resource mapping of transmission of a plurality of data packets. The D2D resource mapping herein includes at least one of D2D time domain resource mapping and D2D frequency domain resource mapping.

In 403, the second terminal may receive the second information configured by a wireless access device serving the second terminal or a core network device serving the second terminal; the second terminal may also configure the second information to achieve a purpose of obtaining the first information; and the second information may also be preset in the second terminal, and is read when the second terminal needs to use the second information. Optionally, if the second terminal receives the second information from the wireless access device serving the second terminal, the second terminal feeds back, to the wireless access device, whether the second information is correctly received. Similarly to 303, the second terminal may also determine the correspondence between a downlink QoS flow and a D2D data packet priority in a manner of reflective mapping. Optionally, the wireless access device may notify the second terminal of whether a correspondence between an uplink QoS flow and a D2D data packet priority can be used for reflective mapping.

A scenario in which the second terminal obtains the second information may be a scenario in which the first terminal finds that the D2D connection may be established to the second terminal. For example, the first terminal finds the second terminal that can implement establishment of the D2D connection. Therefore, the first terminal sends a D2D connection establishment request to the wireless access device by using the second terminal. The wireless access device may notify the second terminal of configuration information required for establishing the D2D connection, and the configuration information includes the second information.

In the scenario in which the second terminal obtains the second information, the second information may be preset in the second terminal when the second terminal is manufactured.

In the scenario in which the second terminal obtains the second information, the wireless access device may notify the second terminal of the second information in a scenario in which the second terminal when powered on initially accesses the wireless access device, re-accesses the wireless access device due to a radio link failure (RLF), or is handed over from another wireless access device to the wireless access device.

The second information may indicate a correspondence between at least one downlink QoS flow and at least one data packet priority (for example, a prose per packet priority, where reference may be made to 3GPP TS 23.303 V14.1.0). When a downlink data packet is to be transmitted, the second terminal may find a D2D data packet priority corresponding to a QoS flow that carries the downlink data packet, and send the downlink data packet based on the D2D data packet priority. In an example, the correspondence between at least one downlink QoS flow and at least one data packet priority may be represented in a form in the following Table 2. A QoS flow 1 and a QoS flow 2 correspond to a data packet priority a, a QoS flow 3 corresponds to a data packet priority b, and a QoS flow 4 corresponds to a data packet priority c.

TABLE 2

| Index of a data packet priority | Identifier of a QoS flow |
|---|---|
| a | 1 |
|  | 2 |

TABLE 2-continued

| Index of a data packet priority | Identifier of a QoS flow |
|---|---|
| b | 3 |
| c | 4 |
| ... | ... |

404. The second terminal sends, to the first terminal based on the correspondence between the downlink QoS flow and the D2D data packet priority and a D2D data packet priority corresponding to the downlink QoS flow, a downlink data packet carried on the downlink QoS flow.

Optionally, in step 404, specifically, the downlink data packet may be transmitted at a protocol layer above a PDCP layer of the second terminal corresponding to that of the first terminal. The protocol layer may reuse an existing protocol layer above the PDCP layer, for example, an SDAP layer; or the protocol layer may be a new protocol layer above the SDAP layer. A specific name of the protocol layer is not limited in this application.

Figure 5:
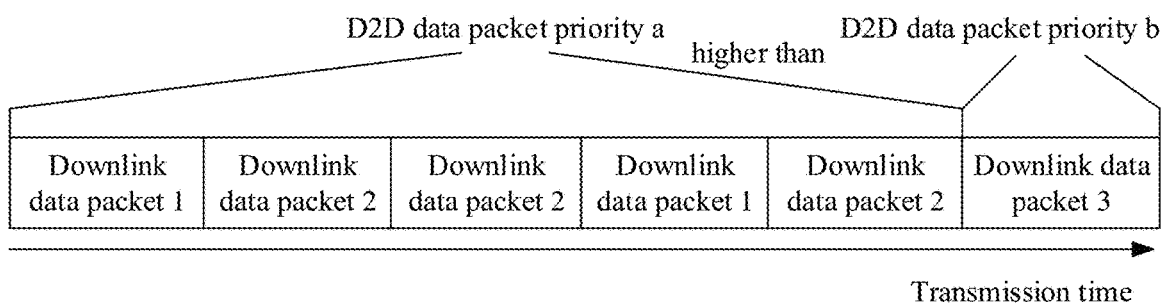
FIG. 5 is a schematic diagram of transmission of a downlink data packet according to an embodiment of this application.
Figure 6:
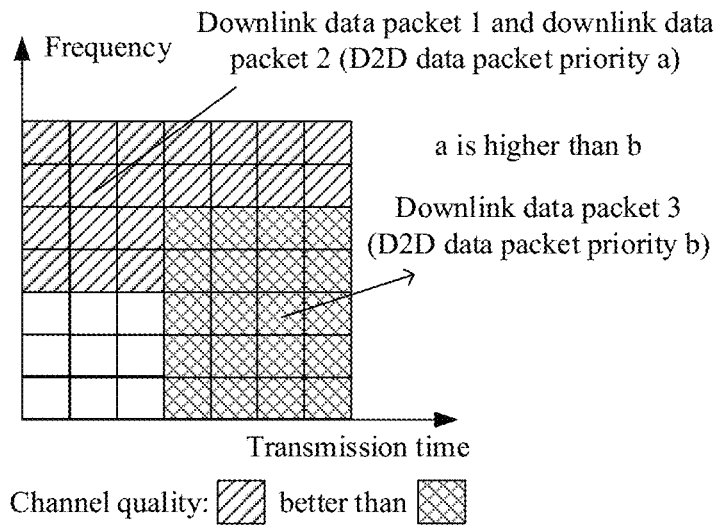
FIG. 6 is a schematic diagram of transmission of a downlink data packet according to an embodiment of this application.

For example, it is assumed that the to-be-transmitted downlink data packet is carried on the QoS flow 1, and the second terminal may determine, based on the correspondence in Table 2, that the QoS flow 1 corresponds to a D2D data packet priority a, perform resource mapping on the downlink data packet on the QoS flow 1 by using the D2D data packet priority a, and then send the downlink data packet to the first terminal. In a possible implementation, as shown in FIG. 5 and FIG. 6, a data packet with a high D2D data packet priority may be preferably transmitted in time domain; a data packet with a high D2D data packet priority is preferably mapped to a time-frequency resource with good signal transmission quality for transmission; and a data packet with a high D2D data packet priority preferably completes transmission, in other words, a data packet with a high D2D data packet priority is preferably transmitted by using a time-frequency resource with good channel quality, and then a data packet with a low D2D data packet priority is transmitted.

In a possible implementation, to identify a QoS flow on which a downlink data packet is carried, the downlink data packet includes an identifier of the QoS flow.

In a possible implementation, to identify a first terminal that receives a downlink data packet, the downlink data packet includes an identifier of the first terminal that receives the downlink data packet.

In a possible implementation, the downlink data packet is encapsulated in a PDCP data packet, and the PDCP data packet includes information indicating that the downlink data packet is an RRC message sent by the wireless access device to the first terminal; or the downlink data packet is encapsulated in an RLC data packet, and the RLC data packet includes information indicating that the downlink data packet is an RRC message sent by the wireless access device to the first terminal. In the possible implementation, after receiving the downlink data packet, if the second terminal determines that the downlink data packet is the RRC message sent to the first terminal, the second terminal does not parse content of the downlink data packet, and directly forwards the downlink data packet to the first terminal.

In this embodiment, the downlink QoS flow corresponds to the D2D data packet priority, so that the second terminal can send data based on the D2D data packet priority corresponding to the QoS flow in which the downlink data packet is located. This can avoid a problem that downlink data packets carried on a same downlink QoS flow are provided with different quality of service on the D2D connection, thereby improving wireless communication quality.

Figure 7:
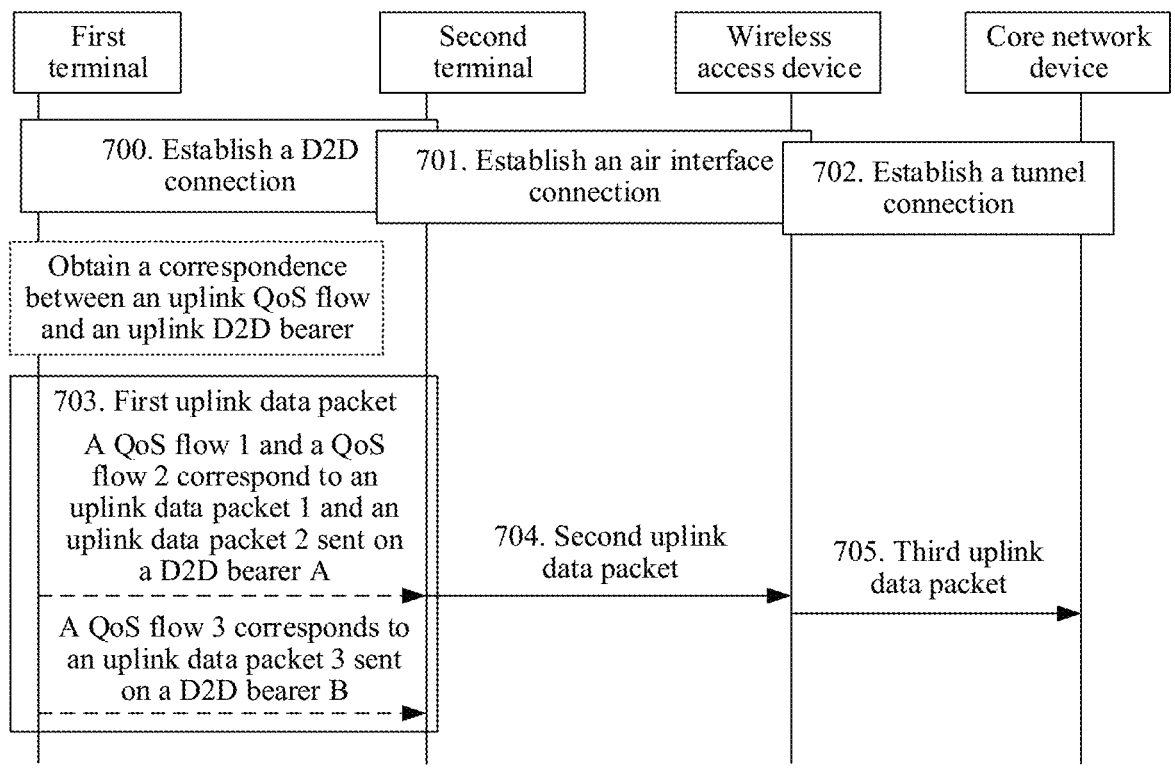
FIG. 7 is a schematic diagram of system interaction of a data transmission method according to an embodiment of this application.

One aspect of the embodiments of this application provides a data transmission method. FIG. 7 is a schematic diagram of system interaction of the data transmission method. This embodiment relates to an uplink data packet transmission process. An uplink QoS flow required by a first uplink data packet sent by a first terminal to a second terminal corresponds to an uplink radio bearer, to improve wireless communication quality on an air interface. Further, the first uplink data packet corresponds to an uplink D2D bearer, to further improve wireless communication quality on a D2D connection.

700. The first terminal establishes a D2D connection to the second terminal.

In 700, the D2D connection between the two different terminals may be further classified into at least two D2D bearers to transmit various data, or the entire D2D connection may be used as a whole instead of being classified into the at least two D2D bearers. For details, refer to a current technology, for example, 3GPP TS 36.300 V14.1.0 or 3GPP TS 23.303 V14.1.0. When the entire D2D connection is used as a whole for data transmission, the entire D2D connection may be considered as one D2D bearer.

701. The second terminal establishes an air interface connection to a wireless access device.

For a process of establishing the air interface connection between the second terminal and the wireless access device and establishing a radio bearer, refer to a current technology, for example, 3GPP TS 36.300 V14.1.0 or 3GPP TS 23.303 V14.1.0.

702. The wireless access device establishes a tunnel connection to a core network device.

For an implementation of establishing the tunnel connection between the wireless access device and the core network device and transmitting data on the tunnel connection based on a QoS flow, refer to a current technology, for example, 3GPP TS 38.300 V0.2.1.

703. The first terminal sends a first uplink data packet to the second terminal on the D2D connection; and the second terminal receives the first uplink data packet on the D2D connection.

In a possible implementation, the entire D2D connection is used as a D2D bearer: The first terminal sends the first uplink data packet to the second terminal on the D2D connection, where the first uplink data packet carries an identifier of a QoS flow required by the first uplink data packet; and the second terminal receives the first uplink data packet on the D2D connection, and determines the QoS flow required by the first uplink data packet.

In another possible implementation, the entire D2D connection is classified into at least two D2D bearers. The first terminal obtains a correspondence between an uplink QoS flow and an uplink D2D bearer, and sends, based on the correspondence, the first uplink data packet to the second terminal on an uplink D2D bearer corresponding to the QoS flow required by the first uplink data packet. Correspondingly, the second terminal receives the first uplink data packet on the uplink D2D bearer corresponding to the QoS flow required by the first uplink data packet.

There is no sequence among the step in which the first terminal obtains the correspondence between an uplink QoS flow and an uplink D2D bearer, 700, 701, and 702.

When the first terminal needs to send a first uplink data packet, the first terminal determines a QoS requirement required by the first uplink data packet, to determine an uplink QoS flow that provides the QoS requirement. Optionally, the first terminal receives, by using the second terminal from a wireless access device serving the second terminal, the correspondence configured by the wireless access device or the core network device; or the first terminal may also receive, from the second terminal, the correspondence configured by the second terminal; or the first terminal reads the correspondence preset in the first terminal. Similar to 303, the first terminal may also determine the correspondence between an uplink QoS flow and an uplink D2D bearer in a manner of reflective mapping. Optionally, the wireless access device or the second terminal may notify the first terminal of whether the correspondence between an uplink QoS flow and an uplink D2D bearer can be used for reflective mapping.

It should be noted that the first uplink data packet may carry signaling or service data (for example, a video or a voice). A correspondence between an uplink D2D bearer and an uplink QoS flow may be shown in Table 3.

TABLE 3

| Identifier of a D2D bearer | Identifier of a QoS flow |
|---|---|
| A | 1 |
|   | 2 |
| B | 3 |
| C | 4 |
| ... | ... |

704. The second terminal sends, based on a correspondence between an uplink QoS flow and an uplink radio bearer, a second uplink data packet to the wireless access device on a radio bearer corresponding to the QoS flow required by the first uplink data packet, where the second uplink data packet includes a part or all of the first uplink data packet.

In 704, the second terminal encapsulates, in a form of the second uplink data packet, a part or all of the first uplink data packet received on the corresponding D2D bearer, and sends the second uplink data packet to the wireless access device on an air interface between the second terminal and the wireless access device based on the radio bearer.

In 704, the second terminal may receive a correspondence between at least one QoS flow and at least one radio bearer from the wireless access device. The correspondence indicates an uplink radio bearer corresponding to the uplink QoS flow required by the first uplink data packet to be transmitted. Optionally, the correspondence may also be preset in the second terminal instead of being notified by the wireless access device to the second terminal.

For example, it is assumed that the first uplink data packet to be sent by the first terminal includes an uplink data packet 1 of a required QoS flow 1, an uplink data packet 2 of a required QoS flow 2, and an uplink data packet 3 of a required QoS flow 3. The first terminal sends the uplink data packet 1 and the uplink data packet 2 on a D2D bearer A, and sends the uplink data packet 3 on a D2D bearer B based on the correspondence between an uplink QoS flow and an uplink D2D bearer shown in Table 3.

705. The wireless access device sends the second uplink data packet to the core network device based on a QoS flow on a tunnel connection in a form of a third uplink data packet.

Optionally, the first uplink data packet, the second uplink data packet, and the third uplink data packet include at least one of an identifier of the first terminal and an identifier of the QoS flow required by the first uplink data packet.

Optionally, in steps 703 to 705, transmission of the uplink data packets may be specifically implemented by using protocol layers respectively above peer-to-peer PDCP layers of the first terminal, the second terminal, and the wireless access device. The protocol layer may reuse an existing protocol layer above the PDCP layer, for example, an SDAP layer, or the protocol layer may be a new protocol layer above the SDAP layer. A specific name of the protocol layer is not limited in this application.

In this embodiment, the uplink QoS flow required by the first uplink data packet sent by the first terminal to the second terminal corresponds to the uplink radio bearer, to improve wireless communication quality on an air interface. Further, the first uplink data packet corresponds to the uplink D2D bearer, to further improve wireless communication quality on the D2D connection.

Figure 8:
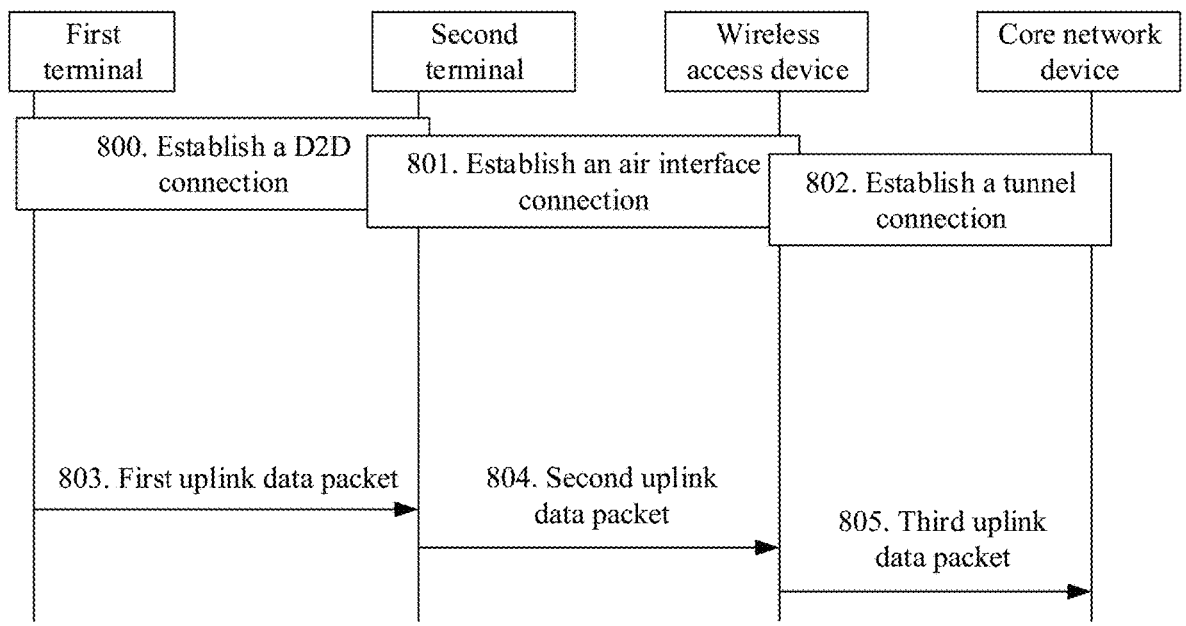
FIG. 8 is a schematic diagram of system interaction of a data transmission method according to an embodiment of this application.

One aspect of the embodiments of this application provides a data transmission method. FIG. 8 is a schematic diagram of system interaction of the data transmission method. This embodiment relates to an uplink data packet transmission process, and a D2D data packet priority corresponds to an uplink radio bearer, to ensure wireless communication quality.

800. A first terminal establishes a D2D connection to a second terminal.

In 800, for a process of establishing a D2D connection between the two different terminals, refer to a current technology, for example, 3GPP TS 36.300 V14.1.0 or 3GPP TS 23.303 V14.1.0.

801. The second terminal establishes an air interface connection to a wireless access device.

For a process of establishing the air interface connection between the second terminal and the wireless access device and establishing a radio bearer, refer to a current technology, for example, 3GPP TS 36.300 V14.1.0 or 3GPP TS 23.303 V14.1.0.

802. The wireless access device establishes a tunnel connection to a core network device.

For an implementation of establishing the tunnel connection between the wireless access device and the core network device and transmitting data on the tunnel connection based on a QoS flow, refer to a current technology, for example, 3GPP TS 38.300 V0.2.1.

803. The second terminal receives, on the established D2D connection, a first uplink data packet sent by the first terminal, where the first uplink data packet includes indication information of a D2D data packet priority of the first uplink data packet.

In a possible implementation, the first terminal may first determine a D2D data packet priority of the first uplink data packet, where the D2D data packet priority of the first uplink data packet corresponds to a QoS flow required by the first uplink data packet; then send the first uplink data packet to the second terminal based on the determined D2D data packet priority on the established D2D connection; and add the D2D data packet priority of the first uplink data packet to the first uplink data packet.

In 803, the first terminal sends the first uplink data packet to the second terminal. The first uplink data packet may include an uplink service data packet, or may also include uplink control signaling. The first uplink data packet includes an identifier of the QoS flow, to indicate a QoS flow to which the first uplink data packet needs to be mapped to obtain corresponding quality of service. The first uplink data packet may also include an identifier of the first terminal, to identify that the first uplink data packet is sent by the first terminal. The indication information of the D2D data packet priority may be an index of the D2D data packet priority.

804. The second terminal sends, based on a correspondence between a D2D data packet priority of the first uplink data packet and a radio bearer, a second uplink data packet on an uplink radio bearer corresponding to the D2D data packet priority, where the second uplink data packet includes a part or all of the first uplink data packet.

In 804, the second terminal may receive the correspondence that is between the D2D data packet priority and the uplink radio bearer and that is configured by the wireless access device or the core network device. Alternatively, the second terminal reads the correspondence that is between the uplink radio bearer and the D2D data packet priority and that is preset on the second terminal. For example, when the second terminal is manufactured, the correspondence is preset in the second terminal. The second uplink data packet may include at least one of an identifier of the QoS flow required by the first uplink data packet and the identifier of the first terminal.

805. The wireless access device sends the second uplink data packet to the core network device on a tunnel connection in a form of a third uplink data packet.

In an example, correspondence between a D2D data packet priority and at least one radio bearer is shown in Table 4, and correspondence between at least one radio bearer and at least one QoS flow is shown in Table 5. A QoS flow 1 and a QoS flow 2 correspond to a radio bearer X, a QoS flow 3 corresponds to a radio bearer Y, and a QoS flow 4 corresponds to a radio bearer Z. The radio bearer X corresponds to a D2D data packet priority a, the radio bearer Y corresponds to a D2D data packet priority b, and the radio bearer Z corresponds to a D2D data packet priority c.

TABLE 4

| Index of a data packet priority | Identifier of a radio bearer |
|---|---|
| a | X |
| b | Y |
| c | Z |
| ... | ... |

TABLE 5

| Identifier of a radio bearer | Identifier of a QoS flow |
|---|---|
| X | 1 |
|   | 2 |
| Y | 3 |
| Z | 4 |
| ... | ... |

It is assumed that the first uplink data packet includes an index "a" of a data packet priority, and the required QoS flow is the QoS flow 2. The second terminal sends the first uplink data packet to the wireless access device on the radio bearer X in a form of the second uplink data packet based on content in Table 4. The wireless access device sends, based on content in Table 5 and with reference to identifier selection of the required QoS flow included in the second uplink data packet, the third uplink data packet on the tunnel connection based on the QoS flow 2. If the required QoS flow is the QoS flow 3, the wireless access device selects, based on the content in Table 5, the QoS flow 2 that can provide quality of service closest to that of the QoS flow 3, to send the third uplink data packet to the core network device on the tunnel connection.

Optionally, in steps 803 to 805, transmission of the uplink data packets may be specifically implemented by using the protocol layers above corresponding PDCP layers of the first terminal, the second terminal, and the wireless access device. The protocol layer may reuse an existing protocol layer above the PDCP layer, for example, an SDAP layer, or the protocol layer may be a new protocol layer above the SDAP layer. A specific name of the protocol layer is not limited in this application.

In this embodiment, the second terminal sends, based on the correspondence between a D2D data packet priority of the first uplink data packet and an uplink radio bearer, the first uplink data packet in a form of the second uplink data packet on the radio bearer corresponding to the D2D data packet priority. This can avoid a problem that uplink data packets of a same D2D data packet priority are provided with different quality of service on an air interface, thereby improving wireless communication quality.

Figure 9:
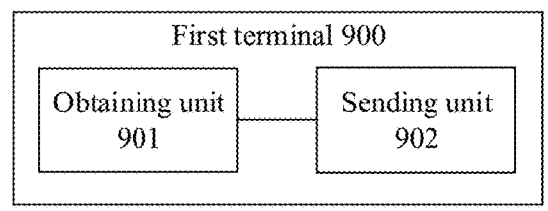
FIG. 9 is a schematic structural diagram of a first terminal according to an embodiment of this application.

An embodiment of this application provides a first terminal 900. FIG. 9 is a schematic structural diagram of the first terminal. The first terminal includes an obtaining unit 901 and a sending unit 902.

In an implementation, the obtaining unit 901 is configured to obtain a correspondence between an uplink QoS flow required by a first uplink data packet and an uplink device-to-device D2D bearer; and the sending unit 902 is configured to send the first uplink data packet to the second terminal on the uplink D2D bearer corresponding to the uplink QoS flow.

In another implementation, the obtaining unit 901 is configured to obtain a correspondence between a QoS flow required by a first uplink data packet and a device-to-device D2D data packet priority of the first uplink data packet; and the sending unit 902 is configured to send the first uplink data packet to the second terminal on a D2D connection to the second terminal based on the D2D data packet priority corresponding to the QoS flow required by the first uplink data packet.

Optionally, the obtaining unit is specifically configured to receive the correspondence configured by a wireless access device serving the second terminal or a core network device serving the second terminal; or receive the correspondence configured by the second terminal; or read the correspondence preset in the first terminal.

With reference to the foregoing implementations, the first uplink data packet may include at least one of an identifier of the downlink QoS flow and an identifier of the first terminal.

With reference to the foregoing implementations, the first uplink data packet is an RRC message; and the first uplink data packet is encapsulated in a packet data convergence protocol PDCP data packet, and the PDCP data packet includes information indicating that the first uplink data packet is a radio resource control RRC message sent by the first terminal to the wireless access device; or the first uplink data packet is encapsulated in an RLC data packet, and the RLC data packet includes information indicating that the first uplink data packet is an RRC message sent by the first terminal to the wireless access device.

The first terminal in this embodiment may execute execution actions of the first terminal in the foregoing method embodiment. Specifically, the obtaining unit may execute an obtaining action, and the sending unit may execute a sending action. In a physical implementation, reading of the obtaining unit may be implemented by a processor of the first terminal, a receiving action of the obtaining unit may be implemented by a receiver of the first terminal, and the sending unit may be implemented by a transmitter of the first terminal. The processor, receiver, and transmitter of the first terminal may be directly or indirectly connected together by using a physical bus.

Figure 10:
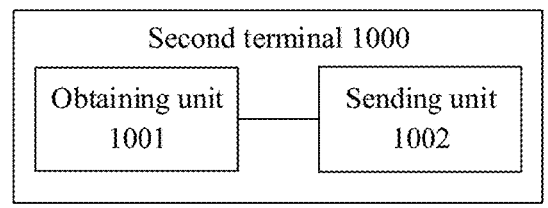
FIG. 10 is a schematic structural diagram of a second terminal according to an embodiment of this application.

An embodiment of this application further provides a second terminal 1000. FIG. 10 is a schematic structural diagram of the second terminal. The second terminal includes an obtaining unit 1001 and a sending unit 1002.

In an implementation, the obtaining unit 1001 is configured to obtain first information, where the first information indicates a correspondence between a downlink QoS flow and a downlink device-to-device D2D bearer; and the sending unit 1002 is configured to send, to a first terminal based on the correspondence on the downlink D2D bearer corresponding to the downlink QoS flow, a downlink data packet carried on the downlink QoS flow. Optionally, the obtaining unit is specifically configured to receive the first information configured by a wireless access device serving the second terminal or a core network device serving the second terminal; or obtain the first information configured by the second terminal; or read the first information preset in the second terminal.

In another implementation, the obtaining unit 1001 is configured to obtain second information, where the second information indicates a correspondence between a downlink QoS flow and a device-to-device D2D data packet priority; and the sending unit is configured to send, to a first terminal based on the correspondence and the D2D data packet priority corresponding to the downlink QoS flow, a downlink data packet carried on the downlink QoS flow. Optionally, the obtaining unit is specifically configured to receive the second information configured by a wireless access device serving the second terminal or a core network device serving the second terminal; or obtain the second information configured by the second terminal; or read the second information preset in the second terminal.

With reference to the foregoing implementation, the downlink data packet may include at least one of an identifier of the downlink QoS flow and an identifier of the first terminal.

With reference to the foregoing implementation, the downlink data packet is an RRC message; and the downlink data packet is encapsulated in a packet data convergence protocol PDCP data packet, and the PDCP data packet includes information indicating that the downlink data packet is a radio resource control RRC message sent by the wireless access device to the first terminal; or the downlink data packet is encapsulated in a radio link control RLC data packet, and the RLC data packet includes information indicating that the downlink data packet is an RRC message sent by the wireless access device to the first terminal.

In another possible implementation, the obtaining unit 1001 is configured to receive a first uplink data packet sent by a first terminal; and the sending unit 1002 is configured to send, based on a correspondence between an uplink QoS flow required by the first uplink data packet and an uplink radio bearer on the uplink radio bearer corresponding to the uplink QoS flow, a second uplink data packet to a wireless access device serving the second terminal, where the second uplink data packet includes a part or all of the first uplink data packet. Optionally, the first uplink data packet may include an identifier of the QoS flow required by the first uplink data packet.

Optionally, the obtaining unit is further configured to: receive third information configured by the wireless access device or a core network device, where the third information indicates the correspondence between the uplink QoS flow and the uplink radio bearer; or receive fourth information configured by the wireless access device or the core network device, where the fourth information indicates a correspondence between a downlink QoS flow and a downlink radio bearer, and the fourth information is used to determine the third information; or read the correspondence that is between the uplink QoS flow and the uplink radio bearer and that is preset on the second terminal.

In another implementation, the obtaining unit 1001 is configured to receive a first uplink data packet sent by a first terminal, where the first uplink data packet includes indication information of a device-to-device D2D data packet priority of the first uplink data packet; and the sending unit is configured to send, based on a correspondence between the D2D data packet priority of the first uplink data packet and a radio bearer, a second uplink data packet on an uplink radio bearer corresponding to the D2D data packet priority, where the second uplink data packet includes a part or all of the first uplink data packet. Optionally, the obtaining unit is configured to: receive fifth information configured by the wireless access device or a core network device, where the fifth information indicates a correspondence between an uplink radio bearer and the D2D data packet priority; or read the correspondence that is between the uplink radio bearer and the D2D data packet priority and that is preset on the second terminal. Optionally, the first uplink data packet includes at least one of an identifier of the QoS flow required by the first uplink data packet and an identifier of the first terminal. The second uplink data packet further includes at least one of the identifier of the QoS flow required by the first uplink data packet and the identifier of the first terminal.

With reference to the foregoing implementation, the first uplink data packet is an RRC message; and the first uplink data packet is encapsulated in a packet data convergence protocol PDCP data packet, and the PDCP data packet includes information indicating that the first uplink data packet is a radio resource control RRC message sent by the first terminal to the wireless access device; or the first uplink data packet is encapsulated in a radio link control RLC data packet, and the RLC data packet includes information indicating that the first uplink data packet is an RRC message sent by the first terminal to the wireless access device.

To implement communication between the first terminal 900 and the second terminal 1000 in the foregoing method embodiment, the first terminal 900 and the second terminal 1000 may separately include at least one antenna array and another electronic circuit.

The first terminal 900 and the second terminal 1000 provided in this embodiment of this application can implement beneficial effects of the technical solutions provided in the foregoing method embodiments.

Figure 11:
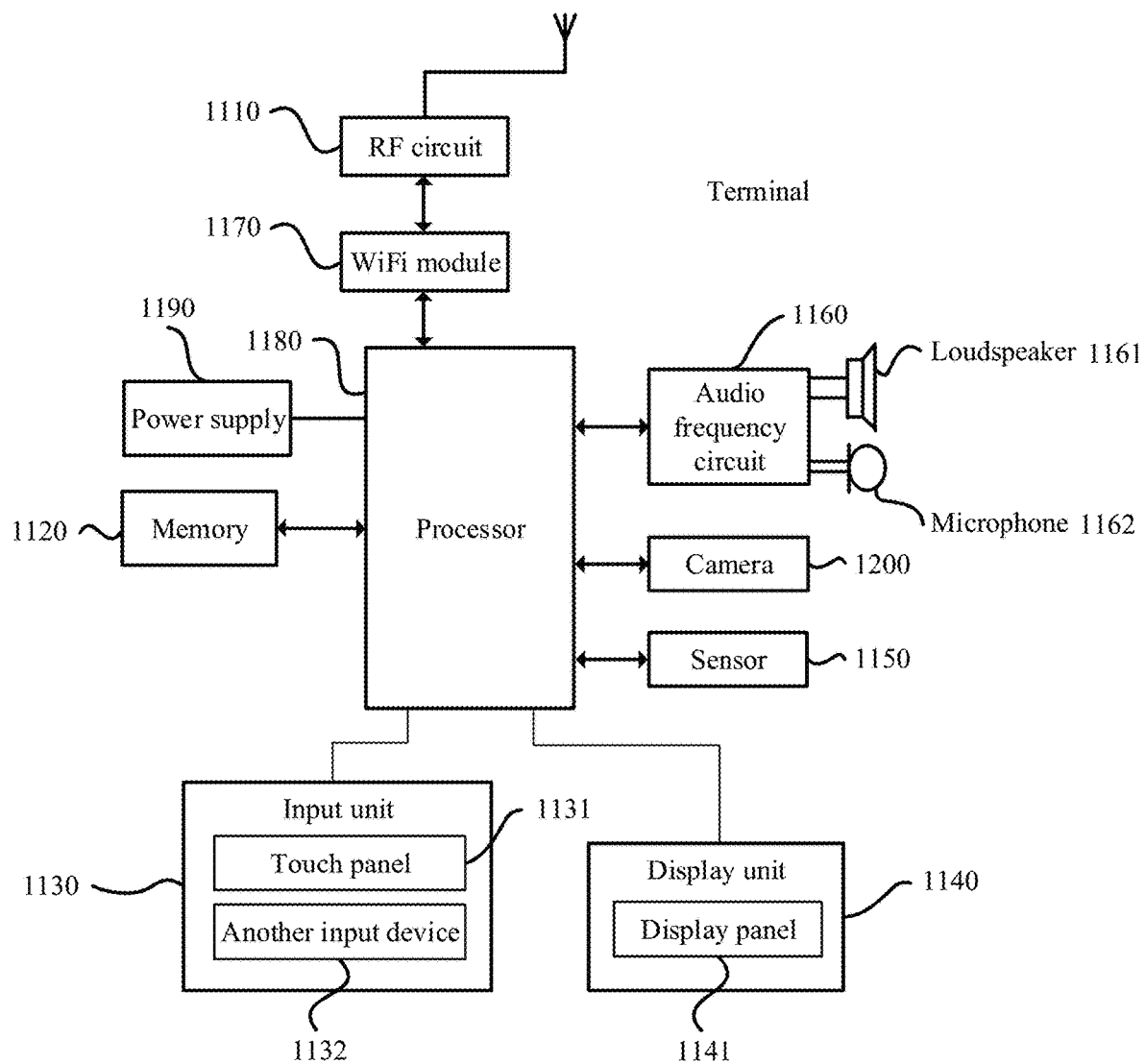
FIG. 11 is a schematic diagram of a general structure of a terminal according to an embodiment of this application.

The embodiments of this application further provide a schematic structural diagram of a terminal 1100 shown in FIG. 11. A structure of the terminal 1100 may be used as a general structure of the first terminal 900 and the second terminal 1000. The terminal 1100 includes components such as a radio frequency (RF) circuit 1110, a memory 1120, an input unit 1130, a display unit 1140, a sensor 1150, an audio circuit 1160, a wireless fidelity (WiFi) module 1170, a processor 1180, and a power supply 1190.

The RF circuit 1110 may be configured to: receive/send a signal in an information receiving or sending process or a call process, for example, after receiving data from a wireless access device, the RF circuit 1110 sends the data to the processor 1180 for processing; and send the data to a base station. Generally, the RF circuit includes but is not limited to an antenna, at least one amplifier, a transceiver, a coupler, a low noise amplifier (LNA), a duplexer, and the like.

The memory 1120 may be configured to store a software program and a module. The processor 1180 performs various functional applications of the terminal 1100 and processes data by running the software program and the module that are stored in the memory 1120. The memory 1120 may mainly include a program storage area and a data storage area. The program storage area may store an operating system, an application program (such as a sound playing function or an image playing function) that is required by at least one function, and the like. The data storage area may store data (such as audio data or a phonebook) that is created according to use of the terminal 1100, and the like. In addition, the memory 1120 may include a high-speed random access memory, and may further include a nonvolatile memory, for example, at least one magnetic disk storage device, a flash storage device, or another volatile solid-state storage device.

The input unit 1130 may be configured to: receive input digital or character information, and generate key signal input related to a user setting and function control of the terminal 1100. Specifically, the input unit 1130 may include a touch panel 1131 and another input device 1132. The touch panel 1131, also referred to as a touchscreen, may collect a touch operation performed by a user on or near the touch panel (for example, an operation performed by the user on or near the touch panel 1131 by using any suitable object or accessory such as a finger or a stylus), and drive a corresponding connection apparatus based on a preset program. Optionally, the touch panel 1131 may include two parts: a touch detection apparatus and a touch controller. The touch detection apparatus detects a touch location of the user, detects a signal brought by a touch operation, and delivers the signal to the touch controller. The touch controller receives touch information from the touch detection apparatus, converts the touch information into touch point coordinates, and sends the touch point coordinates to the processor 1180. In addition, the touch controller can receive and execute a command sent by the processor 1180. In addition, the touch panel 1131 may be of a resistive type, a capacitive type, an infrared type, a surface acoustic wave type, or the like. In addition to the touch panel 1131, the input unit 1130 may further include another input device 1132. Specifically, the another input device 1132 may include but is not limited to one or more of a physical keyboard, a function key (such as a volume control key or an on/off key), a trackball, a mouse, a joystick, and the like.

The display unit 1140 may be configured to display information entered by the user or information provided for the user, and various menus of the terminal 1100. The display unit 1140 may include a display panel 1141. Optionally, the display panel 1141 may be configured in a form of a liquid crystal display (LCD), an organic light-emitting diode (OLED), or the like. Further, the touch panel 1131 may cover the display panel 1141. When detecting the touch operation on or near the touch panel 1131, the touch panel 1131 transmits the touch operation to the processor 1180 to determine a type of a touch event, and then the processor 1180 provides corresponding visual output on the display panel 1141 based on the type of the touch event. Although the touch panel 1131 and the display panel 1141 in FIG. 11 are used as two independent components to implement input and output functions of the terminal 1100, in some embodiments, the touch panel 1131 and the display panel 1141 may be integrated to implement the input and output functions of the terminal 1100.

The terminal 1100 may further include at least one type of sensor 1150, such as an optical sensor, a motion sensor, and another sensor. Specifically, the optical sensor may include an ambient optical sensor and a proximity sensor. The ambient optical sensor may adjust luminance of the display panel 1141 based on brightness of ambient light, and the optical sensor may turn off the display panel 1141 and/or backlight when the terminal 1100 approaches an ear. As a type of motion sensor, an acceleration sensor can detect a value of an acceleration in each direction (generally three axes), and detect a value and a direction of gravity when the acceleration sensor is static, and be used for an application for recognizing a terminal posture (for example, switching between a landscape screen and a portrait screen, a related game, and magnetometer posture calibration), a function related to vibration recognition (such as a pedometer or a knock), and the like. Other sensors such as a gyroscope, a barometer, a hygrometer, a thermometer, and an infrared sensor may also be disposed on the terminal 1100. Details are not described herein.

The audio circuit 1160, a speaker 1161, and a microphone 1162 may provide an audio interface between the user and the terminal 1100. The audio circuit 1160 may transmit, to the loudspeaker 1161, an electrical signal converted from received audio data, and the loudspeaker 1161 converts the electrical signal into a sound signal for output. In addition, the microphone 1162 converts a collected sound signal into an electrical signal. The audio circuit 1160 receives and converts the electrical signal into audio data, and then outputs the audio data to the processor 1180 for processing. The processor 1180 sends processed audio data to, for example, another terminal by using the RF circuit 1110, or outputs the audio data to the memory 1120 for further processing.

WiFi is a short-range wireless transmission technology. By using the WiFi module 1170, the terminal 1100 may help the user receive and send an email, browse a web page, access streaming media, and so on. The WiFi module 1170 provides wireless broadband Internet access for the user. Although FIG. 11 shows the WiFi module 1170, it may be understood that the WiFi module 170 is not a mandatory part of the terminal 1100, and may be omitted based on a requirement without changing the essence of this application.

The processor 1180 is a control center of the terminal 1100, and connects to various parts of the terminal 1100 by using various interfaces and lines. The processor 1180 performs various functions of the terminal 1100 and processes data by running or executing the software program and/or the module stored in the memory 1120 and by invoking data stored in the memory 1120, to perform overall monitoring on the terminal 1100. Optionally, the processor 1180 may include one or more processing units. For example, an application processor and a modem processor may be integrated into the processor 1180, where the application processor mainly processes an operating system, a user interface, an application program, or the like; and the modem processor mainly processes wireless communication. It may be understood that the modem processor may alternatively not be integrated into the processor 1180.

The terminal 1100 further includes a power supply 1190 (such as a battery) for supplying power to each component. Preferably, the power supply may be logically connected to the processor 1180 by using a power supply management system, thereby implementing functions such as charging, discharging, and power consumption management by using the power supply management system.

The terminal 1100 may further include a camera 1200. The camera may be a front-facing camera or a rear-facing camera. Although not shown, the terminal 1100 may further include a Bluetooth module, a global positioning system (GPS) module, and the like. Details are not described herein.

In this application, the processor 1180 included in the terminal 1100 may be configured to execute the foregoing data transmission method embodiments. Implementation principles and technical effects of the processor 1180 are similar to those in the foregoing data transmission method embodiments. Details are not described herein again.

An embodiment of this application further provides a communications apparatus, including a processor and a memory. The memory stores code. When the code is invoked by the processor, method actions executed by the first terminal or the second terminal in the foregoing data transmission method embodiments are implemented. The communications apparatus may be the first terminal or the second terminal, or the communications apparatus may be a chip. The chip includes a processor including at least one gate circuit and a memory including at least one gate circuit. Each gate circuit includes at least one transistor (for example, a field effect transistor) connected by using a conductor, and each transistor is made of a semiconductor material. The chip may be a central processing unit (CPU), a field programmable gate array (FPGA), or a digital signal processor (DPS).

A person skilled in the art should understand that the embodiments of the present application may be provided as a method, a system, or a computer program product. Therefore, the present application may use a form of hardware only embodiments, software only embodiments, or embodiments with a combination of software and hardware. Moreover, the present application may use a form of a computer program product that is implemented on one or more chip systems or computer-usable storage media (including but not limited to a disk memory, a CD-ROM, an optical memory, and the like) that include computer-usable program code.

The present application is described with reference to the flowcharts and/or block diagrams of the method, the apparatus (system), and the computer program product according to the embodiments of the present application. It should be understood that computer program instructions may be used to implement each process and/or each block in the flowcharts and/or the block diagrams and a combination of a process and/or a block in the flowcharts and/or the block diagrams. These computer program instructions may be provided for a general-purpose computer, a dedicated computer, an embedded processor, or a processor of any other programmable data processing device to generate a machine, so that the instructions executed by a computer or a processor of any other programmable data processing device generate an apparatus for implementing a specific function in one or more processes in the flowcharts and/or in one or more blocks in the block diagrams.

These computer program instructions may be stored in a computer readable memory that can instruct the computer or any other programmable data processing device to work in a specific manner, so that the instructions stored in the computer readable memory generate an artifact that includes an instruction apparatus. The instruction apparatus implements a specific function in one or more processes in the flowcharts and/or in one or more blocks in the block diagrams.

These computer program instructions may be loaded onto a computer or another programmable data processing device, so that a series of operations and steps are performed on the computer or the another programmable device, thereby generating computer-implemented processing. Therefore, the instructions executed on the computer or the another programmable device provide steps for implementing a specific function in one or more processes in the flowcharts and/or in one or more blocks in the block diagrams.

Although some preferred embodiments of the present application have been described, a person skilled in the art can make changes and modifications to these embodiments once they learn the basic inventive concept. Therefore, the following claims are intended to be construed to cover the preferred embodiments and all changes and modifications falling within the scope of the present application.

Apparently, a person skilled in the art can make various modifications and variations to the present application without departing from the spirit and scope of the present application. The present application is intended to cover these modifications and variations provided that they fall within the scope of protection defined by the following claims and their equivalent technologies.

What is claimed is:

1. A method, comprising:
   receiving, by a second terminal, first information, wherein the first information comprises a correspondence between a plurality of downlink quality of service (QoS) flows and a plurality of downlink device-to-device (D2D) bearers, wherein the plurality of D2D bearers are usable to communicate between the second terminal and a first terminal, each QoS flow of the plurality of downlink QoS flows corresponds to one downlink D2D bearer of the plurality of downlink D2D bearers, and the first information is received by the second terminal from a wireless access device that serves the second terminal or a core network device that serves the second terminal;
   obtaining, by the second terminal, a downlink data packet carried on a first downlink QoS flow, wherein the downlink data packet carries an identification of the first downlink QoS flow;
   selecting, by the second terminal, a first downlink D2D bearer for the first downlink QoS flow by querying the received correspondence using the identification of the first downlink QoS flow, wherein the first downlink D2D bearer is comprised in the plurality of downlink D2D bearers and the first downlink QoS flow is comprised in the plurality of downlink QoS flows; and
   sending, by the second terminal to the first terminal, the downlink data packet on the first downlink D2D bearer corresponding to the first downlink QoS flow; and
   wherein in the received correspondence one downlink D2D bearer uniquely corresponds to at least two QoS flows.

2. The method according to claim 1, wherein the downlink data packet is a radio resource control (RRC) message; and wherein:
   the downlink data packet is encapsulated in a packet data convergence protocol (PDCP) data packet, and the PDCP data packet comprises information indicating that the downlink data packet is a RRC message sent by a wireless access device to the first terminal.

3. The method according to claim 1, wherein the downlink data packet is a radio resource control (RRC) message; and wherein:
the downlink data packet is encapsulated in a radio link control (RLC) data packet, and the RLC data packet comprises information indicating that the downlink data packet is an RRC message sent by a wireless access device to the first terminal.

4. A method, comprising:
receiving, by a second terminal, a first correspondence from a wireless access device that serves the second terminal or a core network device that serves the second terminal, wherein the first correspondence is between a plurality of D2D bearers usable to communicate between the second terminal and a first terminal and a plurality of quality of service (QoS) flows, and each QoS flow of the plurality of QoS flow corresponds to one D2D bearer of the plurality of D2D bearers, and in the correspondence one downlink D2D bearer uniquely corresponds to at least two QoS flows;
sending, by the second terminal, the first correspondence to the first terminal;
receiving, by the second terminal, a first uplink data packet sent by the first terminal using a first uplink device-to-device (D2D) bearer, wherein the plurality of D2D bearers comprises the first uplink D2D bearer, and the first uplink D2D bearer corresponds to a first uplink QoS flow required by the first uplink data packet in the first correspondence;
querying a second correspondence based on the first uplink QoS flow required by the first uplink data packet, to identify an uplink radio bearer corresponding to the first uplink QoS flow; and
sending, by the second terminal based on the second correspondence, a second uplink data packet to a wireless access device serving the second terminal, wherein the second correspondence comprises a correspondence between the first uplink QoS flow required by the first uplink data packet and an uplink radio bearer corresponding to the first QoS flow, and the second uplink data packet comprises a part or all of the first uplink data packet.

5. The method according to claim 4, further comprising:
receiving, by the second terminal, third information configured by the wireless access device or a core network device, wherein the third information indicates the second correspondence that comprises the correspondence between the first uplink QoS flow and the uplink radio bearer.

6. The method according to claim 4, wherein the first uplink data packet comprises an identifier of the first QoS flow required by the first uplink data packet or an identifier of the first terminal.

7. The method according to claim 4, wherein the second uplink data packet further comprises an identifier of the first QoS flow required by the first uplink data packet.

8. The method according to claim 4, wherein the first uplink data packet is a radio resource control (RRC) message; and wherein:
the first uplink data packet is encapsulated in a packet data convergence protocol (PDCP) data packet, and the PDCP data packet comprises information indicating that the first uplink data packet is a RRC message sent by the first terminal to the wireless access device.

9. The method according to claim 4, further comprising:
receiving, by the second terminal, fourth information configured by the wireless access device or the core network device, wherein the fourth information indicates a third correspondence between a downlink QoS flow and a downlink radio bearer, and the fourth information is used to determine the third information.

10. The method according to claim 4, further comprising:
reading, by the second terminal, the second correspondence that comprises the correspondence between the first uplink QoS flow and the uplink radio bearer and that is preset on the second terminal.

11. The method according to claim 4, wherein the first uplink data packet is a radio resource control (RRC) message; and wherein:
the first uplink data packet is encapsulated in a radio link control (RLC) data packet, and the RLC data packet comprises information indicating that the first uplink data packet is an RRC message sent by the first terminal to the wireless access device.

12. The method according to claim 4, wherein the second uplink data packet further comprises an identifier of the first terminal.

13. A second terminal, comprising:
a processor; and
a non-transitory memory having instructions that are executable by the processor, wherein the instructions comprise instructions for:
receiving first information, wherein the first information comprises a correspondence between a plurality of downlink quality of service flows (QoS flows) and a plurality of downlink device-to-device (D2D) bearers, wherein the plurality of D2D bearers are usable to communicate between the second terminal and a first terminal, each QoS flow of the plurality of downlink QoS flows corresponds to a downlink D2D bearer of the plurality of downlink D2D bearers, and the first information is received by the second terminal from a wireless access device that serves the second terminal or a core network device that serves the second terminal;
obtaining a downlink data packet carried on a first downlink QoS flow, wherein the downlink data packet carries an identification of the first downlink QoS flow;
selecting a first downlink D2D bearer for the first downlink QoS flow by querying the received correspondence using the identification of the first downlink QoS flow, wherein the first downlink D2D bearer is comprised in the plurality of downlink D2D bearers and the first downlink QoS flow is comprised in the plurality of downlink QoS flows; and
sending, to a first terminal, the downlink data packet on the first downlink D2D bearer corresponding to the first downlink QoS flow; and
wherein in the correspondence one downlink D2D bearer uniquely corresponds to at least two QoS flows.

14. The second terminal according to claim 13, wherein:
the downlink data packet is comprised in a radio resource control (RRC) message; and
the downlink data packet is encapsulated in a packet data convergence protocol (PDCP) data packet, and the PDCP data packet comprises information indicating that the downlink data packet is a RRC message sent by a wireless access device to the first terminal.

15. The second terminal according to claim 13, wherein:
the downlink data packet is comprised in a radio resource control (RRC) message; and
the downlink data packet is encapsulated in a radio link control (RLC) data packet, and the RLC data packet comprises information indicating that the downlink data packet is an RRC message sent by a wireless access device to the first terminal.

16. A second terminal, comprising:
a processor; and
a non-transitory memory having instructions stored thereon that are executable by the processor, wherein the instructions comprise instructions for:
receiving a first correspondence from a wireless access device that serves the second terminal or a core network device that serves the second terminal, wherein the first correspondence is between a plurality of D2D bearers usable to communicate between the second terminal and a first terminal and a plurality of quality of service (QoS) flows, and each QoS flow of the plurality of QoS flow corresponds to one D2D bearer of the plurality of D2D bearers, and in the first correspondence one downlink D2D bearer uniquely corresponds to at least two QoS flows;
sending, by the second terminal, the first correspondence to the first terminal;
receiving a first uplink data packet sent by the first terminal using a first uplink device-to-device (D2D) bearer, wherein the plurality of D2D bearers comprises the first uplink D2D bearer, and the first uplink D2D bearer corresponds to a first uplink QoS flow required by the first uplink data packet in the first correspondence;
querying a second correspondence based on the first uplink QoS flow required by the first uplink data packet, to identify an uplink radio bearer corresponding to the first uplink QoS flow; and
sending, based on the second correspondence, a second uplink data packet to a wireless access device serving the second terminal, wherein the second uplink data packet comprises a part or all of the first uplink data packet, and the second correspondence comprises a correspondence between the first uplink QoS flow required by the first uplink data packet and an uplink radio bearer corresponding to the first uplink QoS flow.

17. The second terminal according to claim 16, wherein the instructions further comprise instructions for:
receiving third information configured by the wireless access device, wherein the third information indicates the second correspondence comprising the correspondence between the first uplink QoS flow and the uplink radio bearer.

18. The second terminal according to claim 16, wherein the instructions further comprise instructions for:
receiving fourth information configured by the wireless access device or a core network device, wherein the fourth information indicates a third correspondence between a downlink QoS flow and a downlink radio bearer, the fourth information is used by the second terminal to determine third information, and the third information indicates the second correspondence comprising the correspondence between the first uplink QoS flow and the uplink radio bearer.

19. The second terminal according to claim 16, wherein the instructions further comprise instructions for:
reading the second correspondence that is preset on the second terminal.

20. The second terminal according to claim 16, wherein the instructions further comprise instructions for:
receiving third information configured by a core network device, wherein the third information indicates the second correspondence comprising the correspondence between the first uplink QoS flow and the uplink radio bearer.

* * * * *